May 9, 1933. E. R. EVANS 1,908,335
AXLE ASSEMBLY
Filed May 13, 1929
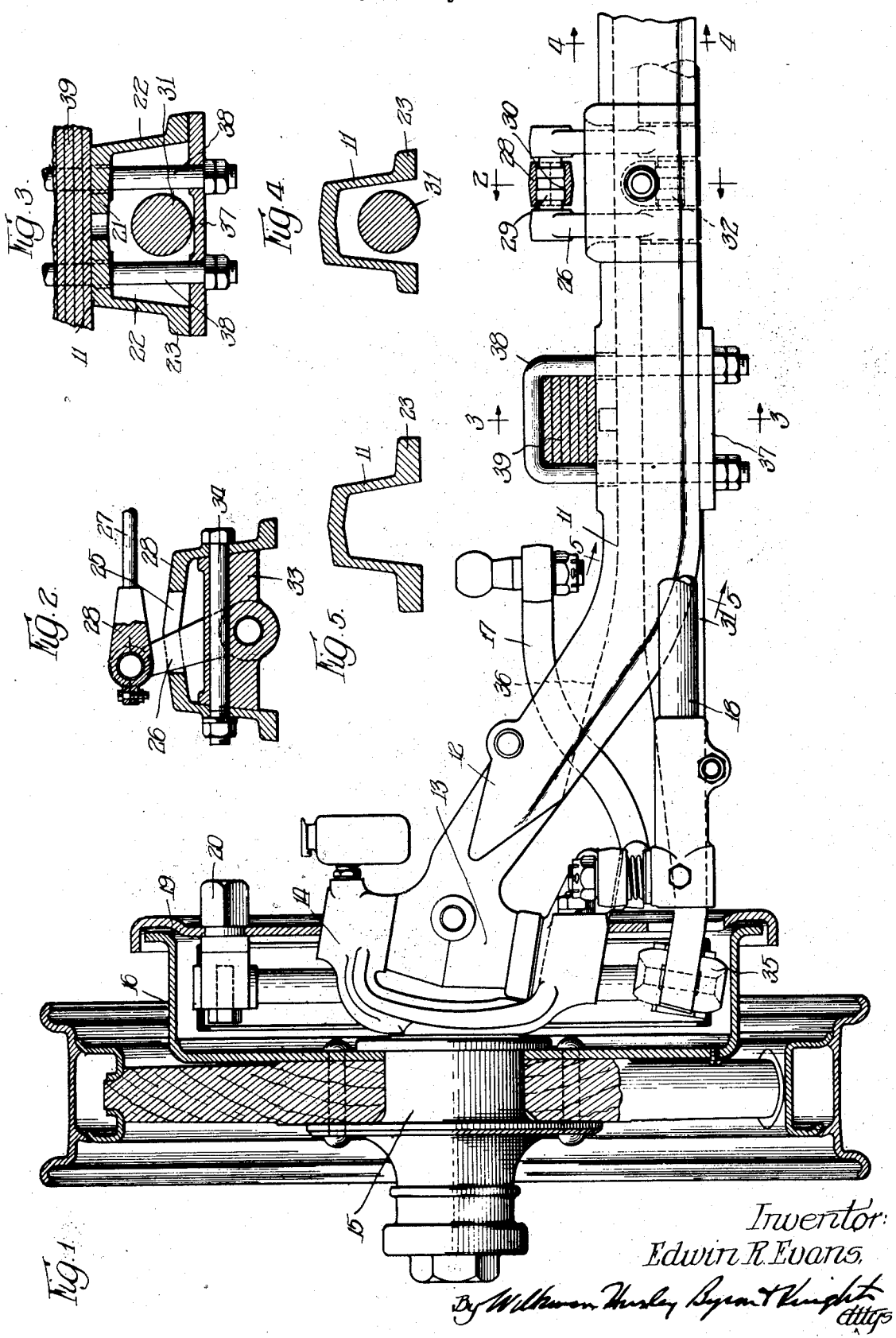
Inventor:
Edwin R. Evans, Patented May 9, 1933

1,908,335

UNITED STATES PATENT OFFICE

EDWIN R. EVANS, OF CHICAGO, ILLINOIS

AXLE ASSEMBLY

Application filed May 13, 1929. Serial No. 362,491.

This invention relates to a new and improved axle assembly, and more particularly to a front axle for vehicles and to a method of associating brake operating mechanism with said axle.

It has been the general practice to construct front axles for vehicles, and particularly for motor vehicles, in the form of an I-beam section. This section, however, has a section modulus about a vertical axis only about one-third that of the section modulus about a horizontal axis. This design was based on an assumption that the stresses to be taken care of were mainly the load of the vehicle which would tend to set up a bending action about the horizontal axis. However, there are other stresses such as bending about the vertical axis and torsional stresses which must be taken care of by a front axle.

The stresses to be handled by a front axle have also been increased due to the use of brakes on the front wheels which are now common. In this case the brake supporting plate and brake assembly, together with the brake operating mechanism, must be largely supported from the front axle. Since the contact of the braking mechanism with the brake drum sets up a torsional stress, this must be taken into account when designing a front axle. Also it will be apparent that the braking of the front wheels will set up a bending stress about a vertical axis in retarding the vehicle itself.

An additional point is that due to the fact that the brake operating levers and rods are now located adjacent the front axle in addition to the location there of the steering arms and tie rods, the front axle assembly has become more complicated.

It is an object of the present invention to provide a front axle assembly for vehicles adapted to adequately take care of bending stresses about both horizontal and vertical axes, as well as torsional stresses.

It is a further object to provide an axle of this character in which the metal is used efficiently in its disposition to take care of stresses.

It is also an object to provide a construction in which the brake operating means may be largely housed within the contour of the axle.

It is a further object to provide an axle construction which is simple in design and adapted for commercial production.

Other and further objects will appear as the description proceeds.

I have shown one form of my construction by way of illustration in the accompanying drawing, in which—

Figure 1 is a front view of one-half of an axle constructed according to my design, together with certain of the associated parts;

Figure 2 is a section taken on line 2—2 of Figure 1;

Figure 3 is a section taken on line 3—3 of Figure 1;

Figure 4 is a section taken on line 4—4 of Figure 1; and

Figure 5 is a section taken on line 5—5 of Figure 1.

In the drawing the axle has been generally indicated by reference character 11. The end portion 12 of the axle is solid and extends upwardly to form the steering head 13 which carries the steering knuckle 14. The steering knuckle 14 supports the wheel 15 in the usual manner, this wheel carrying the brake drum 16. The particular construction of the steering knuckle and wheel assembly forms no part of the present invention and need not be discussed in detail.

The steering knuckle 14 has connected thereto the steering arm 17 and the tie rod 18. The brake supporting plate 19 is also carried by the steering knuckle 14 and this plate, by means of the anchor pivot 20, carries the brake shoes or braking mechanism, which also need not be described in detail.

As shown in Figure 3 the axle 11 is broadened at 21 to form a spring seat which, as shown, has its upper surface slightly sloping to the rear. The legs 22 of the inverted channel section flare outwardly slightly and their lower edges are provided with the enlarged portions 23 which extend outwardly of the inverted channel section. The bottom plate or closure plate 37 is preferably provided, bridging the bottom opening between the legs of the channel below the spring seat. This provides a bearing plate for the U-shaped clips 38 which secure the springs 39 in place. The plate 37 may be welded or otherwise permanently secured in place if desired. This plate has the important function of stiffening the section at the spring seat, where torsional stresses pass between the axle and the springs due to braking effects on the wheels and the inertia or momentum of the car. As shown in Figure 2, the channel continues to be wide in width and its upper web 24 is provided with the opening 25 to permit passage therethrough of the brake operating arms 26. These arms are connected to a pull rod 27 by the fitting 28. As shown in Figure 1, these arms 26 are provided with laterally extending lugs 29 which fit within a cylindrical opening 30 in the fitting 28. The enlarged ends of the lugs 29 may have their surfaces slightly rounded or barrel shaped in order to prevent binding in the fitting 28.

The arms 26 are secured to the brake operating rods 31 which are substantially straight and which have extensions 32 shown in broken lines in Figure 1, fitting into the bearing member 33 which latter is secured within the inverted channel by means of bolt 34. These bearing lugs 32 may be similar in contour to the lugs 29. The outer ends of the brake operating rods 31 carry the brake operating cams 35. In the form of construction shown, these cams 35 and the ends of the rods are so designed that they are supported between the brake shoes carried by the supporting plate 19.

It will be noted that the ends 12 of the axle extend upwardly and as indicated by the broken line 36, the ends of the channel are unobstructed so that the brake rods 31 may be straight and extend directly to the brake assembly. It will be understood that the other half of the channel will be similar to that shown and described with the exception that there will be no provision made for passage of brake operating levers.

The cross section of the central portion of the axle is shown in Figure 4, and is somewhat narrower than the sections carrying the bearing and the spring seat. The section will widen out again to give the spring seat for the spring upon the opposite side of the car. As shown in Figure 5, the enlarged portions 23 on the lower end of the legs are increased in width and area as the ends of the axle incline upwardly.

It will be noted that the channel section has been so designed as to distribute the metal of the section so as to act efficiently about both the horizontal and vertical axes. The legs of the axle 11 flare outwardly and the enlargements 23 are located outside of the channel section so as to increase the section modulus about the vertical axis. Similarly the web is made heavier than the legs and the enlargements 23 are made at the lower ends of the legs so as to increase the section modulus about the horizontal axis. The section is efficient to withstand stresses about both axes and also to take care of torsional stresses.

While I have shown one form of my invention for purposes of illustration, it will be understood that it is capable of change and modification to meet varying requirements and conditions of service and I contemplate such changes and modifications as come within the spirit and scope of the appended claims.

I claim:

1. An axle construction for vehicles, comprising a metal section, the major portion of which is in the form of an inverted channel, with a spring seat formed upon the upper face of the web, and a member closing the bottom of the channel below the spring seat.

2. A front axle assembly for motor vehicles comprising an axle, the central portion of which is in the form of an inverted channel, the ends of said axle being solid and bent upwards to form steering heads whereby the ends of said channel are unobstructed, brakes for the front wheels supported by the steering heads of said axle and brake operating shafts supported at their outer ends by said brakes and extending through said channel portion to pivotal supports upon said axle.

3. A front axle assembly for motor vehicles comprising an axle, the central portion of which is in the form of an inverted channel, the ends of said axle being solid and bent upwards to form steering heads whereby the ends of said channel portion are unobstructed, brakes for the front wheels supported by the steering heads of said axle, a pivotal support carried within the channel portion of said axle, brake operating shafts supported at their outer ends by said brakes and extending through said channel portion to supports at their inner ends upon said pivotal support and a single operating member for actuating said brake shafts.

4. A front axle assembly for motor vehicles comprising an axle, the central portion of which is in the form of an inverted channel, the ends of said axle being solid and bent upwards to form steering heads whereby the ends of said channel portion are unobstructed, brakes for the front wheels supported by the steering heads of said axle, brake operating shafts supported at their outer ends by said brakes and extending through said channel portion for pivotal support at their inner ends upon said axle, said axle having an opening in the top web thereof, lever arms rigid with the inner ends of said shafts extending upwards through said opening and a single operating member connected to said lever arms above said axle for actuating both of said shafts.

Signed at Chicago, Illinois, this 7th day of May, 1929.

EDWIN R. EVANS.